Feb. 16, 1965 K. W. BERNING ETAL 3,170,117
THERMOELECTRIC CALORIMETER DEVICE FOR MEASURING ENERGY
IN A LOAD AND USING A HEAT PUMP
Filed March 24, 1961
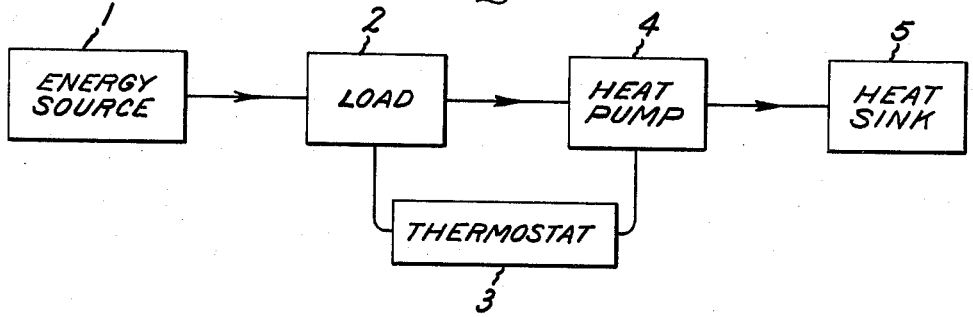
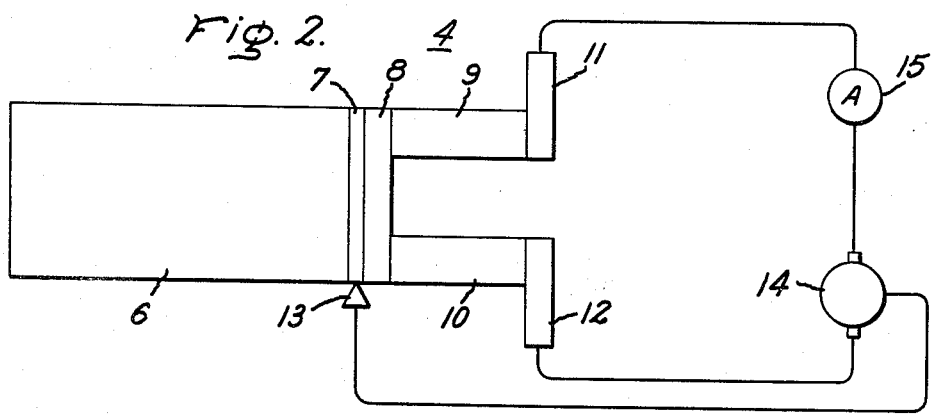
Inventors:
Kenneth W. Berning,
William A. Sebastian, III,
by Roe D M Burnett
Their Attorney.

United States Patent Office 3,170,117
Patented Feb. 16, 1965

3,170,117
THERMOELECTRIC CALORIMETER DEVICE FOR MEASURING ENERGY IN A LOAD AND USING A HEAT PUMP
Kenneth W. Berning, Whitesboro, and William A. Sebastian III, Holland Patent, N.Y., assignors to General Electric Company, a corporation of New York
Filed Mar. 24, 1961, Ser. No. 98,181
4 Claims. (Cl. 324—106)

This invention relates to energy measuring devices and more particularly to a device utilizing a thermoelectric heat pump to measure thermal energy.

In the past, thermal energy has been measured by detecting a temperature rise in a body to which the energy is applied or by detection of a temperature rise in a fluid passing through the body to which the thermal energy is applied. Still another thermal energy measurement means used is the dual body calorimeter in which a body similar in thermal characteristics is kept in thermal equilibrium with the primary load body by application of some easily measurable external power.

These previous devices have been subject to a number of defects, especially when they are to be used with a heat producing thermal load element to measure radio frequency power. For example, the devices have been of excessive size and weight due to the amount of insulation needed to prevent heat losses. In addition, the residual thermal energy and resulting temperature rise have limited the frequency of use in all but the fluid calorimeter devices.

Another problem has been that of thermal isolation. In the dual body device, thermal isolation must exist between the bodies. In all radio frequency power measuring applications, it is necessary to isolate the thermal load body from the radio frequency components. However, almost without exception, radio frequency components are excellent thermal conductors and since the load body exhibits a temperature rise, thermal migration to the radio frequency components will take place and result in a power measuring error.

It is accordingly an object of this invention to provide an improved thermal energy measuring device.

It is another object of this invention to provide an improved thermal energy measuring device which can be used to measure radio frequency power.

It is another object of this invention to provide a thermal energy measuring device which is small in size and has no moving parts.

It is another object of this invention to provide a thermal energy measuring device in which the temperature of the body being measured does not change.

It is another object of this invention to provide a thermal energy measuring device which utilizes the Peltier effect.

It has long been known that when current of a given polarity passes through a junction of two dissimilar materials, a cooling effect will be observed at the junction. This phenomena is known as the Peltier effect. Heat pumps have been made which utilize this effect, and they are known as thermoelectric heat pumps.

Briefly stated, and in accordance with one aspect of the invention, such a thermoelectric heat pump is positioned in thermal relation with a terminal load in which the energy being supplied to the load is converted into heat. A controlled current source supplies current to the heat pump to maintain the load at a constant temperature, the heat pump thereby removing thermal energy from the load at the same rate as energy is being supplied to the load. Since the rate of heat which can be transferred by the heat pump is a function of the current being supplied to the heat pump, a measure of this current will be a measure of the rate of heat being pumped, and thus a measure of the power being supplied to the load.

For a better understanding of the invention, reference may be had to the accompanying drawings, in which:
FIG. 1 shows, in block diagram form, a system utilizing the subject invention to measure power; and
FIG. 2 shows, in schematic form, an embodiment of the subject invention being utilized in conjunction with a wave guide to measure microwave R.F. power.

Referring to FIG. 1, an energy source 1 supplies energy to a load 2, in which the energy supplied is converted into heat. When energy is supplied to the load 2 and is converted to heat therein, the temperature of the load 2 will rise. In accordance with the invention, the resultant rise in temperature is sensed by a thermostatic element 3 in association with the heat pump 4, which is in thermal relation with the load 2. The heat pump 4 then removes heat from the load 2 at such a rate as to maintain the load 2 at a constant temperature. The heat is removed to the heat sink 5 for dissipation. Thus, when the load 2 is being maintained at a constant temperature, the rate of heat being removed by the heat pump 4 is exactly equal to the rate of energy being supplied by the energy source 1 to the load 2 and the measurement of the rate of heat being removed by the heat pump 4 will be a measure of the power being supplied by the energy source 1 to a load 2.

FIG. 2 shows an embodiment of the invention being used in conjunction with a wave guide 6 and an R.F. absorbing heat generating, nonreactive load 7, shown schematically, to measure the power level of an electromagnetic wave of the microwave frequency range within the wave guide 6. The electromagnetic wave is transmitted from a source (not shown) through the wave guide 6 to the load 7, shown schematically, wherein substantially all the energy in the electromagnetic wave is converted into heat as is well known.

The thermoelectric heat pump 4 is comprised of the following elements: A member 8 of good electrical and thermal conductivity, which is in thermal relation with the load 7, member 9 having a large positive Seebeck coefficient relative to the member 8, a member 10 having a large negative Seebeck coefficient relative to the member 8, a member 11 being similar to member 8 and a member 12 being similar to the member 8.

In such a thermoelectric heat pump, the heat absorbing junctions are the contiguous inner faces between the members 8 and 9 and members 8 and 10. The heat evolving junctions are the contiguous inner faces between the members 9 and 11 and the members 10 and 12.

In operation, when an electromagnetic wave is supplied to the wave guide 6, the load 7 will convert the electromagnetic wave into resultant heat, which will in turn cause the temperature of the load 7 to increase. The increase in temperature of the load 7 will be detected by the temperature sensory element 13, which may be a thermocouple or the like. The temperature sensory element 13 in turn controls a current source 14, which supplies current of the correct polarity to the thermoelectric heat pump 4. The rate at which heat is pumped by the thermoelectric heat pump 4, that is to say the rate at which heat is transferred from the heat absorbing junctions to the heat evolving junctions, is a function of the magnitude of the current being supplied to the heat pump 4, with this function being well known to those skilled in the art.

The current source 14, under the control of the temperature sensory element 13, supplies just enough current to the thermoelectric heat pump 4 so as to maintain the load 7 at a constant predetermined temperature; the thermoelectric heat pump 4 thus removing energy from the load to the heat evolving junctions at the same rate as the electromagnetic wave supplies energy to the load 7. The heat may then be removed from the members 11 and 12 to any suitable heat sink in any suitable manner.

A current measuring device 15, which may be an ammeter, is connected in series circuit comprising the current source 14 and the thermoelectric heat pump 4. The device 15, while measuring the current being supplied by the current source 14, may be calibrated directly in terms of the rate of heat being pumped by the thermoelectric heat pump 4 and thus provide a direct measure of the power level of any electromagnetic wave in the wave guide 6 or the device 15 may be calibrated in units of current, from which the power level may be readily calculated. With the addition of a suitable integrating device, a quantity of energy may be measured.

The thermoelectric heat pump 4 may be constructed from elements as follows: The elements 8, 11 and 12 may be made from a material having a substantially zero Seebeck coefficient and exhibiting good electrical and heat conductivity, such as copper, the member 9 may be made of bismuth telluride made to exhibit a P-type conductivity and the member 10 may be made of bismuth telluride made to exhibit an N-type conductivity.

As is apparent from the foregoing description, the subject calorimeter invention operates most accurately when the selected reference temperature for the system is the ambient temperature. At this predetermined temperature, there is negligible extraneous heat energy interchange between the load and the surrounding environment.

While the invention is thus disclosed and a particular embodiment shown, it is obviously not limited to this arrangement, but many modifications will become apparent to those skilled in the art. For example, the invention is not limited to a particular form of thermoelectric heat pumps shown, but any suitable thermoelectric heat pump may be utilized. The invention is thus intended to be limited only by the appended claims.

What is claimed as new and is desired to be secured by Letters Patent of the United States is:

1. A device for measuring energy in a load in which the energy being measured is converted into resultant heat, comprising, an energy load the temperature of which tends to vary in accordance with the energy supplied thereto, a thermoelectric heat pump in thermal relation with the load, means responsive to the resultant temperature of said load to control the amount of heat being pumped by said thermoelectric heat pump in such a manner as to maintain said load at a constant predetermined temperature, and means for measuring the heat being pumped by said heat pump, whereby a measurement of the rate energy is being converted into resultant heat by said load is obtained without changing the temperature of said load in response to said energy being measured.

2. A wattmeter for measuring electric power in a nonreactive electrical load in which the electric power being measured is converted into resultant heat, comprising, an electrical load the temperature of which tends to vary in accordance with the energy supplied thereto, a thermoelectric heat pump being in thermal relation with the said electrical load, means for supplying electric current to said thermoelectric heat pump, said current being of such polarity that said thermoelectric heat pump absorbs heat from said electrical load, means responsive to the resultant temperature of said electrical load to control the amount of current being supplied to said thermoelectric heat pump in such a manner as to maintain said electrical load at a predetermined constant temperature, and means for measuring the current being supplied to said thermoelectric heat pump, whereby a measurement of the electric power being converted into resultant heat by said electrical load is obtained without changing the temperature of said load in response to said energy being measured.

3. A device for measuring energy in a load in which the energy being measured is converted into resultant heat, comprising, an energy load the temperature of which tends to vary in accordance with the energy supplied thereto, a thermoelectric heat pump having a heat absorbing junction and a heat evolving junction, said heat absorbing junction being in thermal relation with said load, means for supplying current to said thermoelectric heat pump, means responsive to the resultant temperature of said load to control the amount of current being supplied to said thermoelectric heat pump in such a manner as to maintain said load at a predetermined constant temperature, and means for measuring the current being supplied to said thermoelectric heat pump, whereby a measurement of the rate energy is being converted into a resultant heat by said load is obtained without changing the temperature of said load in response to said energy being measured.

4. A device for measuring radio frequency power in a wave guide having a load therein in which the power being measured is converted into resultant heat, comprising, an electrical load the temperature of which tends to vary in accordance with the energy supplied thereto, a thermoelectric heat pump having a heat absorbing junction and a heat evolving junction, said heat absorbing junction being positioned such that it is in thermal relation with said electrical load, means for supplying current to said thermoelectric heat pump, means responsive to the resultant temperature of said electrical load to control the amount of current being supplied to said thermoelectric heat pump such that said electrical load is maintained at a predetermined constant temperature, and means for measuring the current being supplied to said thermoelectric heat pump, whereby a measurement of radio frequency power being converted into resultant heat by said electrical load is obtained without changing the temperature of said load in response to said energy being measured.

References Cited in the file of this patent
UNITED STATES PATENTS

| | | |
|---|---|---|
| 2,468,691 | Smith | Apr. 26, 1949 |
| 2,975,638 | Morrison | Mar. 21, 1961 |
| 2,998,707 | Meess | Sept. 5, 1961 |